US009445382B2

(12) United States Patent
Zhang et al.

(10) Patent No.: US 9,445,382 B2
(45) Date of Patent: Sep. 13, 2016

(54) METHOD AND DEVICE FOR DETECTING SECONDARY SYNCHRONOUS SIGNAL, COMPUTER PROGRAM AND STORAGE MEDIUM

(71) Applicant: Telefonaktiebolaget L M Ericsson (publ), Stockholm (SE)

(72) Inventors: Liping Zhang, Beijing (CN); Baicheng Xu, Nuremberg (DE); Jing Ma, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/407,354

(22) PCT Filed: Nov. 6, 2013

(86) PCT No.: PCT/CN2013/086647
§ 371 (c)(1),
(2) Date: Dec. 11, 2014

(87) PCT Pub. No.: WO2015/066866
PCT Pub. Date: May 14, 2015

(65) Prior Publication Data
US 2015/0189609 A1    Jul. 2, 2015

(51) Int. Cl.
*H04W 56/00* (2009.01)
*H04L 25/02* (2006.01)
*H04J 11/00* (2006.01)

(52) U.S. Cl.
CPC ........ *H04W 56/001* (2013.01); *H04J 11/0073* (2013.01); *H04J 11/0076* (2013.01); *H04J 2011/0096* (2013.01); *H04L 25/0204* (2013.01)

(58) Field of Classification Search
CPC ............. H04J 11/0073; H04J 11/0076; H04J 2011/0096; H04W 56/001; H04L 25/0204
See application file for complete search history.

(56) References Cited

U.S. PATENT DOCUMENTS

| 2013/0128877 A1 | 5/2013 | Reddy |
| 2013/0301491 A1* | 11/2013 | Bashar ................ H04W 76/048 370/280 |

(Continued)

FOREIGN PATENT DOCUMENTS

| CN | 103326971 A | 9/2013 |
| WO | 2013/070994 A1 | 5/2013 |

OTHER PUBLICATIONS

3GPP, "3rd Generation Partnership Project; Technical Specification Group Radio Access Network;Evolved Universal Terrestrial Radio Access (E-UTRA); Requirements for support of radio resource management (Release 12)," V12.4.0 (Jul. 2014).

(Continued)

*Primary Examiner* — Brian D Nguyen
(74) *Attorney, Agent, or Firm* — Patent Portfolio Builders PLLC

(57) ABSTRACT

The present invention provides a method and a device for detecting a secondary synchronous signal, a computer program and a storage medium. The method comprises: Step S1: extracting a first SSS sequence from a received signal according a PSS detection result; Step S2: performing rotation on the first SSS sequence, to obtain at least two second sequences including the first SSS sequence, channel paths corresponding to the at least two second sequences being located within a channel window in a time domain; Step S3: calculating a channel estimation result of each of the second sequences corresponding to each of SSS standard sequences; Step S4: selecting, according to the channel estimation result, valid channel paths corresponding to the respective SSS standard sequence from the channel paths corresponding to the second sequences; Step S5: calculating a signal-to-noise ratio corresponding to the respective SSS standard sequence according to the valid channel paths corresponding to the respective SSS standard sequence; and Step S6: determining a cell ID according to the SSS standard sequence corresponding to a maximum signal-to-noise ratio. According to the present invention, it is able to improve the accuracy of the SSS detection.

14 Claims, 15 Drawing Sheets

(56) References Cited

U.S. PATENT DOCUMENTS

| | | | | |
|---|---|---|---|---|
| 2013/0321042 A1* | 12/2013 | Xu | ........................ | H04W 56/00 327/141 |
| 2014/0050206 A1* | 2/2014 | Seo | ........................ | H04W 56/00 370/336 |
| 2014/0071960 A1* | 3/2014 | Gorokhov | ............. | H04W 24/02 370/336 |
| 2014/0301385 A1* | 10/2014 | Joung | ................ | H04W 56/0015 370/350 |
| 2015/0043541 A1* | 2/2015 | Blankenship | ........ | H04B 7/2656 370/336 |

OTHER PUBLICATIONS

International Search Report issued in corresponding International application No. PCT/CN2013/086647, date of mailing Aug. 13, 2014.

Written Opinion of the International Searching Authority issued in corresponding International application No. PCT/CN2013/086647, date of completion of the opinion Aug. 6, 2014.

3GPP, "3rd Generation Partnership Project; Technical Specification Group Radio Access Network; Evolved Universal Terrestrial Radio Access (E-UTRA); Radio Resource Control (RRC); Protocol specification (Release 11)," 3GPP TS 36.331 V11.4.0 (Jun. 2013).

3GPP, "3rd Generation Partnership Project; Technical Specification Group Radio Access Network; Evolved Universal Terrestrial Radio Access (E-UTRA); User Equipment (UE) procedures in idle mode (Release 11)," 3GPP TS 36.304 V11.4.0 (Jun. 2013).

3GPP, "3rd Generation Partnership Project; Technical Specification Group Radio Access Network; Evolved Universal Terrestrial Radio Access (E-UTRA); Physical layer; Measurements (Release 11)," 3GPP TS 36.214 V11.1.0 (Dec. 2012).

3GPP, "3rd Generation Partnership Project; Technical Specification Group Radio Access Network; Evolved Universal Terrestrial Radio Access (E-UTRA); Physical Channels and Modulation (Release 11)," 3GPP TS 36.211 V11.3.0 (Jun. 2013).

* cited by examiner

METHOD AND DEVICE FOR DETECTING SECONDARY SYNCHRONOUS SIGNAL, COMPUTER PROGRAM AND STORAGE MEDIUM

TECHNICAL FIELD

The present invention relates to the field of mobile communication technology, in particular to a method and a device for detecting a secondary synchronous signal in a 3rd generation partnership project long term evolution (3GPP LTE) system, a computer program and a storage medium.

BACKGROUND

LTE is a standard for wireless data communication technology. A goal of LTE is to increase the capacity and speed of wireless data networks. Another goal of LTE is to redesign and simplify the network architecture of an IP-based system with significantly reduced transfer latency compared to the 30G architecture. As shown in FIG. 1, EUTRAN (Evolved Universal Terrestrial Radio Access Network) consists of enhanced NodeBs (eNodeBs) at the network side. eNodeBs are connected to each other via the X2 interface, and they connect to the packet switched core network via the S1 interface.

In the LTE system, cell search means that a User Equipment (UE) acquires downlink synchronization (including time synchronization and frequency synchronization) with a base station and detects a physical-layer ID of a cell. Based on the above information, the UE can receive and read broadcast information of the cell, and acquire system information of the cell so as to determine the subsequent operations, such as cell selection, cell reselection and cell switch. UE can also be referred to as a mobile terminal, mobile phone, mobile communication device etc.

In a LTE system, the cell synchronization may be achieved by a synchronous signal transmitted over a downlink channel. The synchronous signal, which is transmitted in the LTE system every 5 ms, includes a primary synchronous signal (PSS) and a secondary synchronous signal (SSS). For a frequency division duplexing (FDD) mode and a time division duplexing (TDD) mode, the positions of PSS and SSS in a 10 ms frame are shown in FIGS. 2a and 2b respectively.

In the LTE system, the cell search procedure based on PSS and SSS mainly comprises PSS detection and SSS detection. In the prior art, the SSS detection may be performed by using a non-coherent detection method, which generally comprises the steps of:

performing correlation calculation on SSSs from different antennae (if any) and different data blocks (if any) in a frequency domain, to obtain a plurality of SSS correlation sequences;

combining all of the SSS correlation sequences; and detecting SSS IDs according to a combination result.

However, because the received SSSs are not equalized, the non-coherent SSS detection method is of poor performance in a fading channel environment.

SUMMARY

An object of embodiments herein is to provide a method and a device for detecting a secondary synchronous signal in a LTE system, a computer program and a storage medium, so as to improve the accuracy of non-coherent SSS detection in a fading channel environment.

In one aspect, embodiments herein provide a method for detecting a secondary synchronous signal in a LTE system, comprising:

Step S1: extracting a first SSS sequence from a received signal according a PSS detection result;

Step S2: performing rotation on the first SSS sequence, to obtain at least two second sequences including the first SSS sequence, wherein channel paths corresponding to the at least two second sequences being located within a channel window in a time domain;

Step S3: calculating a channel estimation result of each of the second sequences corresponding to each of SSS standard sequences;

Step S4: selecting, according to the channel estimation result, valid channel paths corresponding to the respective SSS standard sequence from the channel paths corresponding to the second sequences;

Step S5: calculating a signal-to-noise ratio (SNR) corresponding to the respective SSS standard sequence according to the valid channel paths corresponding to the respective SSS standard sequence; and Step S6: determining a cell ID according to the SSS standard sequence corresponding to a maximum signal-to-noise ratio.

In order to further reduce the error rate of the SSS detection, the method further comprises:

Step S7: judging whether or not the maximum signal-to-noise ratio is greater than or equal to a predetermined threshold, if yes, determining that the cell with the cell ID is a valid cell, otherwise determining that the cell with the cell ID is an invalid cell.

In another aspect, embodiments herein further provide a device for detecting a secondary synchronous signal in a LTE system, comprising:

an extraction module, configured to extract a first SSS sequence from a received signal according to a PSS detection result;

a rotation module, configured to perform rotation on the first SSS sequence, to obtain at least two second sequences including the first SSS sequence, wherein channel paths corresponding to the at least two second sequences being located within a channel window in a time domain;

a channel estimation module, configured to calculate a channel estimation result of each of the second sequences corresponding to each of SSS standard sequences;

a selection module, configured to select, according to the channel estimation result, valid channel paths corresponding to the respective SSS standard sequence from the channel paths corresponding to the second sequences;

a calculation module, configured to calculate a signal-to-noise ratio corresponding to the respective SSS standard sequence according to the valid channel paths corresponding to the respective SSS standard sequence; and a determination module, configured to determine a cell ID according to the SSS standard sequence corresponding to a maximum signal-to-noise ratio.

In order to further reduce the error rate of the SSS detection, the device further comprises:

a judgment module, configured to judge whether or not the maximum signal-to-noise ratio is greater than or equal to a predetermined threshold, if yes, determine that the cell with the cell ID is a valid cell, and otherwise determine that the cell with the cell ID is an invalid cell.

In yet another aspect, embodiments herein further provide a computer program and a storage medium.

In an Additive White Gaussian Noise (AWGN) channel environment, the channel energy is distributed in the time domain in a single-path manner, while in the fading channel environment, the SSS channel response energy is distributed in a multi-path manner, e.g., in a channel window as shown in FIG. 2b. In an existing non-coherent SSS detection method, merely a first path is taken into consideration, so it is impossible to collect the accurate SSS power in the received signal. When the detection is performed based on the inaccurate power information, the detection result will certainly be inaccurate. However, according to the non-coherent SSS detection method of embodiments herein, several paths, which are located in the channel window and over which the SSS energy may probably be distributed, are selected to determine the SSS power in the received signals. As a result, in the fading channel environment, the SSS power information may be collected by using the method of embodiments herein in a more accurate manner as compared to the prior art, thereby the accuracy of the SSS detection will be improved.

DETAILED DESCRIPTION

According to a method and a device for detecting a secondary synchronous signal in a LTE system, a computer program and a storage medium of embodiments herein, in a fading channel environment, the signal energy of SSS sequences, which is distributed over a plurality of channel paths, is collected, a signal-to-noise ratio corresponding to a respective SSS standard sequence is calculated according to the collected signal energy, and then an SSS standard sequence for determining a cell ID is selected according to the signal-to-noise ratio corresponding to the SSS standard sequence. As a result, it is able to improve the accuracy of non-coherent secondary synchronous signal detection in the fading channel environment To facilitate the understanding, prior to the detailed description, some concepts and theories involved in embodiments herein will be briefly described hereinafter.

In embodiments herein, as compared with the prior art, at least one of the followings may be introduced into the non-coherent SSS detection method so as to improve the accuracy of the SSS detection.

1. A signal-to-noise ratio (SNR) may be introduced into the non-coherent SSS detection method. The total power of a received signal may be directly calculated according to SSS distribution information in a frequency domain, and the useful power of the received signal may be acquired according to a correlation result. That is, both the useful power and the noise power of the received signal may be acquired, thereby it is able to calculate the SNR accurately.

2. A synchrony hypothesis may be introduced so as to calculate the SNR accurately. Each synchrony hypothesis corresponds to a path over which the SSS energy may probably be distributed, and the SSS energy distributed over a plurality of paths may be collected so as to improve the accuracy of the SSS detection in the fading channel environment 3. The validity of the SSS detection may be further judged according to the calculated SNR.

Followings are the detailed explanations.

Timing Hypothesis

Figure 3:
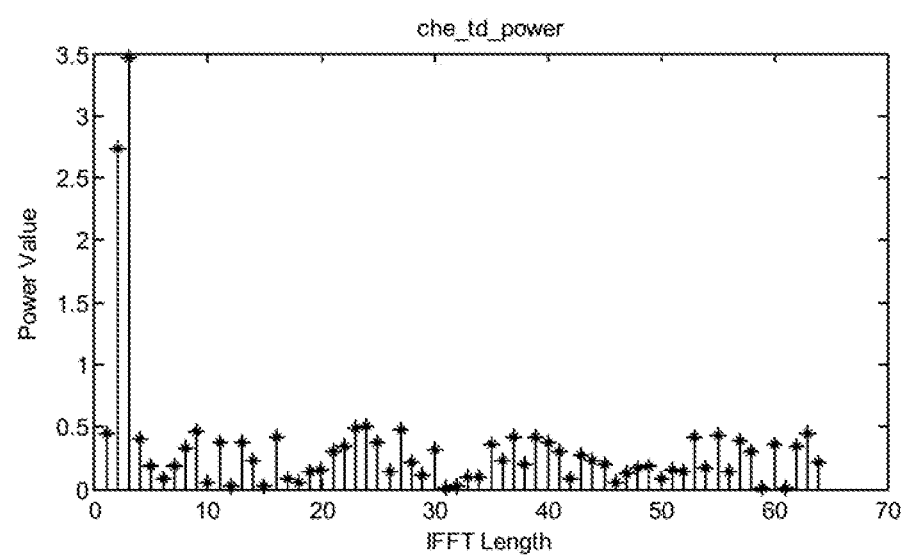
FIG. 3 is a schematic view showing the distribution of signal power in a fading channel environment.
Figure 4:
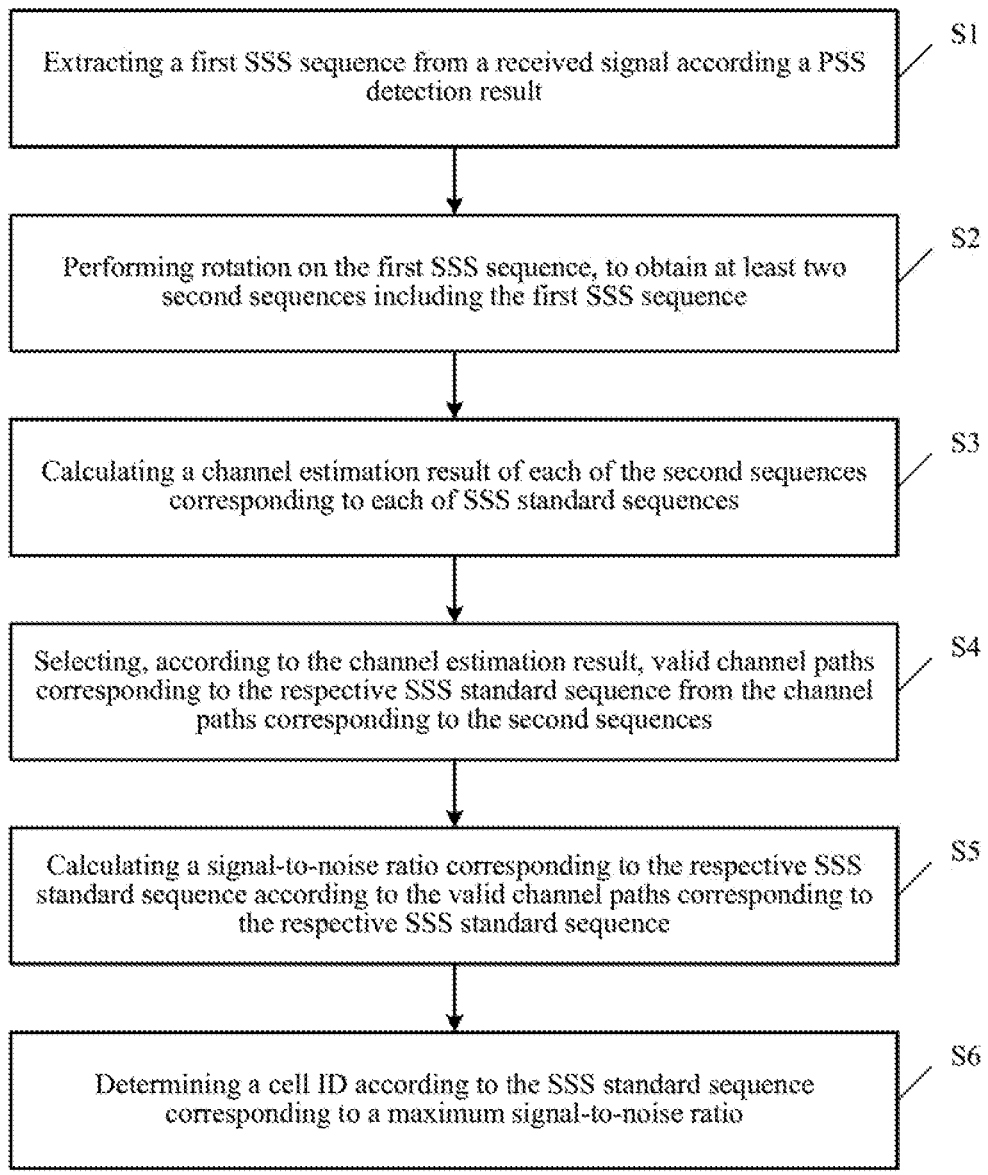
FIG. 4 is a flow chart of a method for detecting a secondary synchronous signal.
Figure 5:
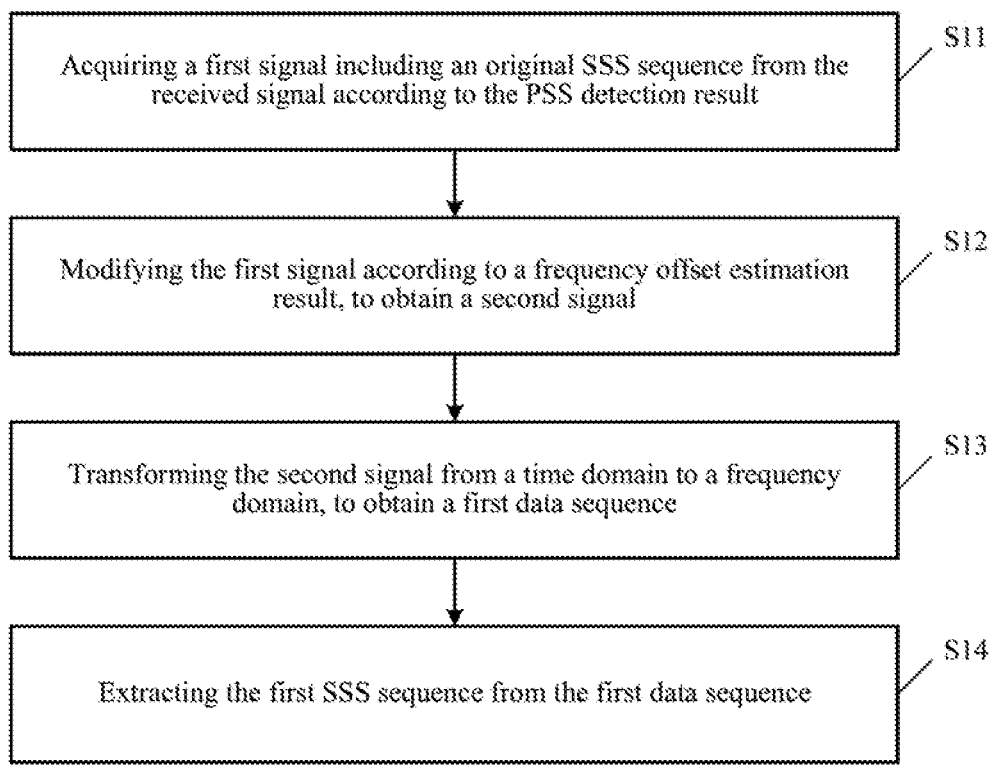
FIG. 5 is a flow chart of Step S1 in the method for detecting the secondary synchronous signal.

In an AWGN channel environment, the channel energy is distributed in a time domain, in a single-path manner while in the fading channel environment, the SSS channel response energy is distributed in a multi-path manner, as shown in FIG. 3.

Presumed that an SSS standard sequence defined in a 3GPP standard is expressed as s(k), k=0, 1, . . . , 61, the received signals from a Rx antenna q and a data block n are expressed as $Rx\_sig_{q,\,n}(m)$, m=0, 1, . . . , 71 and 62 central sub-carriers (excluding DC) for carrying SSS are expressed as $Rx\_sig_{q,\,n}(k)$, k=0, 1, . . . , 61 the frequency-domain channel response estimation $che\_fd_{q,\,n}(k)$ for the $k^{th}$ sub-carrier may be calculated by the following equation:

$$che\_fd_{q,\,n}(k) = Rx\_sss_{q,\,n}(k) \cdot S^+(k).$$

The frequency-domain channel response estimation $che\_fd_{q,\,n}(k)$ may be transformed to the time-domain channel response estimation $che\_td_{q,\,n}$, through inverse fast Fourier transform (IFFT), i.e., $che\_td_{q,\,n} = \text{IFFT}(che\_fd_{q,\,n}(k))$. Then, the signal power $che\_td\_power_{q,\,n}(t)$ of the time-domain channel response estimation may be calculated by the following equation:

$$che\_td\_power_{q,\,n}(t) = |che\_td_{q,\,n}(t)|^2,$$

wherein, t represents an IFFT point.

The total power $che\_td\_power(t)$ of the received signals at the $t^{th}$ IFFT point may be calculated by the following equation:

$$che\_td\_power_{q,\,n}(t) = \Sigma_{q,\,n} che\_td\_power_{q,\,n}(t).$$

Because the received SSS is distorted by the channel fading in the fading channel environment, the time-domain channel response energy will be distributed over different channel paths, as shown in FIG. 3.

The signal power is not distributed over a single path any more, so it is required to provide a channel window with a length of winLength so as to collect all possible signal power. In the embodiments herein, the signal energy distributed over different channel paths in the channel window will be acquired, so as to improve the calculation accuracy of the signal power, thereby to improve the accuracy of the SSS detection.

Based on IFFT, the time-domain channel response estimation $che\_td_{q,\,n}(t)$ for the $t^{th}$ channel path within the channel window may be expressed as:

$$che\_td_{q,n}(t) = \left(\sum_k che\_fd_{q,n}(k)e^{-j(2\pi kt/IFFTLenth)}\right) \Big/ IFFTLenth.$$

Hence, the power of the time-domain channel response estimation $che\_td_{q,\,n}(t)$ may be calculated by the following equations:

$$|che\_td_{q,n}(0)|^2 = \left|\left(\sum_k che\_fd_{q,n}(k)\right)\middle/ IFFTLenth\right|^2$$

$$|che\_td_{q,n}(1)|^2 = \left|\left(\sum_k che\_fd_{q,n}(k)e^{-j(2\pi k/IFFTLenth)}\right)\middle/ IFFTLenth\right|^2$$

....

It can be seen that, the power of a different channel path within the channel window is a quotient of a sum of the power of the channel response of a frequency-domain signal sequence corresponding to the channel path and an IFFT length IFFTLenth.

Through the above, it is able to calculate, in the frequency domain, the power distribution over the channel path in the time domain. However, due to the introduction of IFFT, the calculation is complex. In the embodiments herein, the power of $che\_td_{q,n}(t)$ is calculated through Fast Hadamard Transform (FHT), i.e., $$|che\_td_{q,n}(t)|^2 = FHT(che\_td_{q,n}, e^{-j(2\pi t/IFFTLenth)})/IFFTLenth^2.$$

The power of the $t^{th}$ channel path, i.e., $che\_td\_power(t)$, may be calculated by the following equation:

$$che\_td\_power(t) = \Sigma_{q,n} |che\_td_{q,n}(t)|^2.$$

Introduction of SNR

In an original coherent SSS detection method or non-coherent SSS detection method, a correlation result of the received SSS and each standard SSS is directly used, a target standard SSS that has the maximum correlation with the received SSS is selected from all of the standard SSSs, and then the cell is determined according to the target standard SSS. However, the target standard SSS will always exist even if the received signal is pure noise, so the cell determined according to the target standard SSS is a fake one.

According to the method of embodiments herein, an SNR, rather than the correlation result of the received SSS and each standard SSS, is used to determine the target standard SSS, so as to improve the accuracy of the SSS detection. The reasons will be described hereinafter.

In order to calculate the SNR, it is required to calculate the noise power at first. In the embodiments herein, the noise is divided into two parts, i.e., a noise signal distributed over 10 blank sub-carriers, and a noise signal distributed over 62 central sub-carriers.

In the embodiments herein, because the useful signal is merely distributed in the channel window, the noise power will be a difference between the power of the entire received signal and the power of the useful signal in the channel window.

In the embodiments herein, the power of the useful signal is calculated by using the power of the useful signal in valid channel paths, rather than by directly using the power of all the signals in the channel window, so as to improve calculation accuracy. The detail will be described hereinafter.

The SNR may be determined after the noise power and the signal power are required.

An embodiment herein provides a method for detecting a secondary synchronous signal which, as shown in FIG. 3, comprises:

Step S1: extracting a first SSS sequence from a received signal according a PSS detection result;

Step S2: performing rotation on the first SSS sequence, to obtain at least two second sequences including the first SSS sequence, channel paths corresponding to the at least two second sequences being located within a channel window in a time domain;

Step S3: calculating a channel estimation result of each of the second sequences corresponding to each of SSS standard sequences;

Step S4: selecting, according to the channel estimation result, valid channel paths corresponding to the respective SSS standard sequence from the channel paths corresponding to the second sequences;

Step S5: calculating a signal-to-noise ratio corresponding to the respective SSS standard sequence according to the valid channel paths corresponding to the respective SSS standard sequence; and Step S6: determining a cell ID according to the SSS standard sequence corresponding to a maximum signal-to-noise ratio.

Figure 1:
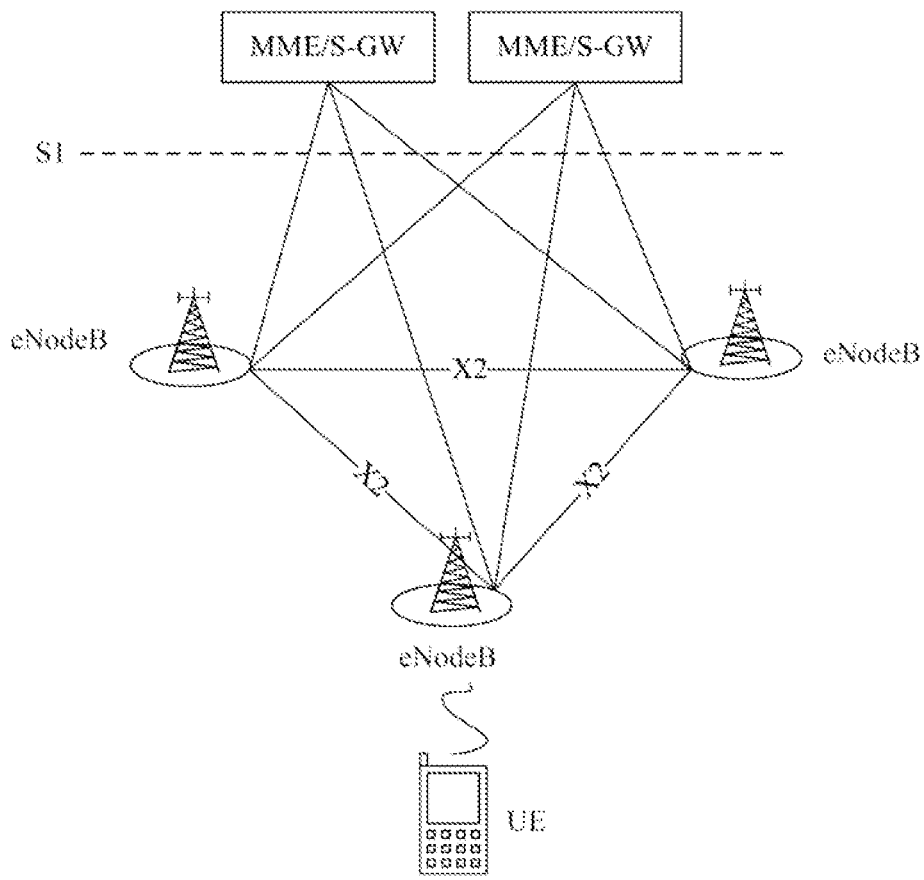
FIG. 1 is a schematic view showing a network architecture of a LTE system.
Figure 2A:
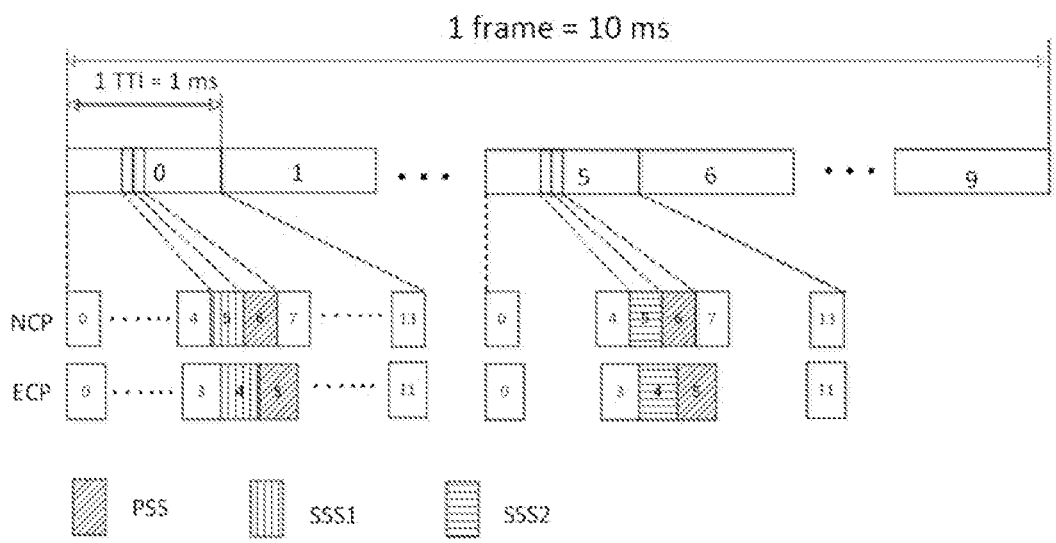
FIG. 2a is a schematic view showing the positions of PSS and SSS in a 10 ms frame for an FDD mode.
Figure 2B:
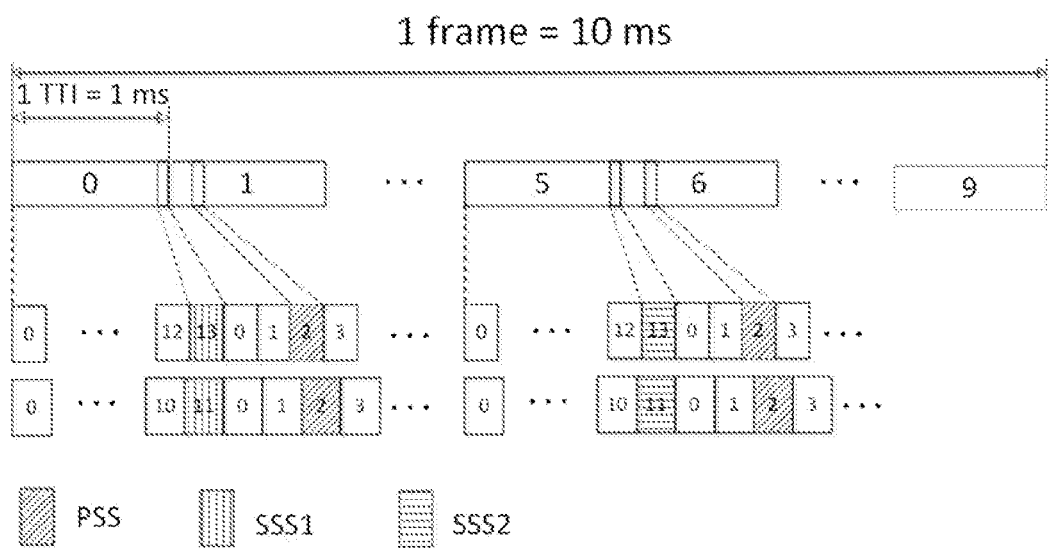
FIG. 2b is a schematic view showing the positions of PSS and SSS in a 10 ms frame for a TDD mode.

In an Additive White Gaussian Noise (AWGN) channel environment, the channel energy is distributed in a single-path manner in the time domain, while in the fading channel environment, the SSS channel response energy is distributed in a multi-path manner, e.g., the SSS channel response energy is distributed in a channel window as shown in FIG. 2. In the existing non-coherent SSS detection method, merely a first path is taken into consideration, so it is impossible to collect an accurate SSS power in the received signals. When the detection is performed based on the inaccurate power information, the detection result will certainly be inaccurate. However, in the non-coherent SSS detection method of embodiments herein, several paths, which are located in the channel window and over which the SSS energy may probably be distributed, are selected to determine the SSS power in the received signals. As a result, in the fading channel environment, the SSS power information may be collected by the method of embodiments herein in a more accurate manner as compared to the prior art, thereby the accuracy of the SSS detection will be improved.

In the existing non-coherent SSS detection method, the SSS standard sequence having a maximum correlation value with the detected SSS is directly used to determine the cell ID. However, no matter whether the received signal is noise or a real SSS, there always exists an SSS standard sequence having the maximum correlation value therewith. Hence, although the cell can be determined by using the existing non-coherent SSS detection method, it is impossible to judge whether the cell determined according to a detected SSS ID is a real one or a fake one. In order to solve this problem, the method further comprises:

Step S7: judging whether or not the maximum SNR is greater than or equal to a predetermined threshold, if yes, determining that the cell with the cell ID is a valid cell, and otherwise determining that the cell with the cell ID is an invalid cell.

If the detected signal is a pure noise signal or it includes excessive noise signals, the SNR of the received signal will be very small, even close to zero. Due to this characteristic, the SNR of the received signal is used in embodiments herein to identify a fake cell. When the SNR of the received SSS is too small, it may be judged that the cell determined according to the non-coherent SSS detection method of embodiments herein is an invalid cell. As a result, it is able to inform in advance the system not to use the invalid cell for the subsequent operations, such as cell selection, cell reselection ad cell switch, thereby to prevent unnecessary consumption of the computing resources.

In the embodiments herein, it is required at first to extract an SSS sequence from the received signal according to a PSS detection result. The SSS sequence may be extracted in various ways, and a possible way is described hereinafter.

As shown in FIG. 3, Step S1 comprises:

Step S11: acquiring a first signal including an original SSS sequence from the received signal according to the PSS detection result;

Step S12: modifying the first signal according to a frequency offset estimation result, to obtain a second signal;

Step S13: transforming the second signal from a time domain to a frequency domain, to obtain a first data sequence; and Step S14: extracting the first SSS sequence from the first data sequence.

It should be appreciated that, the embodiments herein are provided on the premise that the PSS has been detected accurately.

To be specific, for k PSS candidates, an ID, a synchronization time and an initial frequency offset of the $k^{th}$ ($0 \leq k \leq K-1$) PSS are defined as p(k), t(k) and f(k) respectively. A synchronization time of the SSS signal may be expressed as t(k)−δ, with a data range of [t(k)−δ, t(k)−δ+127]. δ represents a synchronization time difference between PSS and SSS, and its value depends on a CP mode and a frame structure, as shown in the following Table.

| Frame Structure | CP Mode | |
|---|---|---|
| | Normal CP | Extended CP |
| TDD | 412 | 480 |
| FDD | 137 | 160 |

To facilitate the subsequent description, the SSS corresponding to the $n^{th}$ data block, the $q^{th}$ Rx antenna, the $k^{th}$ PSS candidate and the xCP (x='N' or 'E') mode is defined as a vector $\hat{r}^{(n, q, k, xCP)}$, wherein $n \in [0, N-1], q \in [0, 1], k \in [0, K-1], x \in ['N', 'E']$.

After the above data sequence is extracted in the time domain, it is required to modify the extracted original signal according to the frequency offset estimation result so as to obtain a signal $\hat{\underline{r}}^{(n, q, k, xCP)}(m)$, i.e., $\underline{r}^{(n, q, k, xCP)}(m) = r^{(n, q, k, xCP)}(m)e^{-j2\pi f^{(k)}m}$, wherein m=0, 1, 2, ..., 127.

Then, the time-domain signal $\hat{r}^{(n, q, k, xCP)}(m)e^{-j2\pi f^{(k)}m}$ is transformed to a frequency-domain signal $\tilde{r}^{(n, q, k, xcp)}$ through FFT, i.e., $\tilde{r}^{(n, q, k, xcp)} = FFT(\underline{r}^{(n, q, k, xCP)})$.

After acquiring the frequency-domain sequence, it is able to extract the first SSS sequence according to the distribution of real SSSs.

According to an existing specification, the SSS is carried on 62 central sub-carriers. At this time, the extracted first SSS sequence $\tilde{r}^{(n, q, k, xcp)}(m)$ (m=0, 1, 2, ..., 61) is expressed as:

$\tilde{r}^{(n, q, k, xcp)}(m) = \tilde{r}^{(n, q, k, xcp)}(m')$, wherein $m' = \begin{cases} m+97, 0 \leq m \leq 30 \\ m-30, 31 \leq m \leq 60 \end{cases}$.

It should be appreciated that, the extracted first SSS sequence will change along with variations of the subsequent specifications, which is not described herein.

In the embodiments herein, the SNR is used to determine the SSS standard sequence for determining the cell ID. At this time, it needs to know the SNR of the SSS in the received signal. In the fading channel environment, the SSS energy is distributed over different channel paths, so it is required to perform rotation on the first SSS sequence, so as to obtain at least two second sequences.

The obtained second sequences are represented in the time domain as a plurality of adjacent paths in the channel window. As shown in FIG. 2, these adjacent paths may be the first, second, third and fourth channel paths. Of course, according to different selection ranges, they may be the first, second and third paths, or the second, third and fourth paths, and so on. In embodiments herein, these paths over which the SSS energy may probably be distributed are just used to calculate the SSS power. As a result, it is able to calculate the SSS energy in the received signal in a more accurate manner, thereby to improve the accuracy of the SSS detection.

In the embodiments herein, after acquiring the plurality of second sequences, it is required to calculate a channel estimation result of each of the second sequences corresponding to each of SSS standard sequences. The channel estimation result may be calculated in the frequency domain.

However, when calculating the channel estimation result in the frequency domain, it is required to perform an IFFT operation, which certainly results in an increase in the calculation complexity. In the embodiments herein, in order to reduce the calculation complexity, the channel estimation result may be calculated through FHT, which will be described hereinafter.

Referring to FIG. 2, the rotation has been performed, and the obtained second sequences correspond to the second, third, fourth and fifth paths in FIG. 2. Obviously, the noise energy distributed over the fifth path is far more than the SSS energy. In the embodiments herein, it is also required to select a valid SSS sequence from all of the second sequences so as to improve the calculation accuracy of the power.

In the embodiments herein, several strategies may be used to select the valid SSS sequence, and two of them are described hereinafter.

Selection Strategy 1

In this selection strategy, the noise power is taken as a reference. With respect to the SSS standard sequence $S_{i,j}$, if the useful power in the channel path corresponding to a sequence is greater than a predetermined multiple of the noise power of the SSS standard sequence $S_{i,j}$ in the received signal, this sequence will be considered as a valid sequence.

Referring to FIG. 2, the second, third, fourth and fifth paths constitute the channel path corresponding to the second sequence, and the entire received signal has the noise power. The second channel path has relatively big useful power (e.g., more than three times the noise power), thus it will be selected as the valid channel path. The fifth channel path has relative small useful power and does not meet the above requirement, thus it cannot be selected as the valid channel path.

In the embodiments herein, each of the noise power and the useful power corresponds to its own SSS standard sequence. When the SSS standard sequences are different, the noise power and the useful power will be different too.

For example, signal A and signal B, with the power as X and Y respectively, are distributed over a channel path. If it is required to detect signal A in the received signal, the useful power in the received signal will be X and the noise power will be Y. If it is required to detect signal B in the received signal, the useful power will be Y and the noise power will be X.

Selection Strategy 2

In this selection strategy, the channel path with the maximum signal power is used as a reference, and the power of the channel path corresponding to the valid SSS sequence is greater than a second predetermined multiple (greater than 0 and less than 1, e.g., 0.8, 0.6 and 0.55) of the maximum power of the channel paths.

Referring to FIG. 2, the maximum power of the channel paths is the power of the third channel path. If a large second predetermined multiple is selected, merely the third channel path may probably be selected as the valid path. The smaller the second predetermined multiple, the more the valid channel paths.

In embodiments herein, it is required to calculate the SNR with respect to each SSS standard sequence $S_{i,j}$, i.e., $$(\text{pathPow}_{i,j} - \sigma_{i,j}^2 * \text{pathNum}_{i,j})/\sigma_{i,j}^2$$

wherein $\text{pathPow}_{i,j}$ represents a sum of the useful power of the valid channel paths corresponding to the SSS standard sequence $S_{i,j}$ in the channel window, $\text{pathPow}_{i,j}$ represents the number of the valid channel paths corresponding to the SSS standard sequence $S_{i,j}$ in the channel window, and $\sigma_{i,j}^2$ represents the noise power of the SSS standard sequence $S_{i,j}$.

For example, for K PSS candidates, an ID, a synchronization time and an initial frequency offset of the $k^{th}$ ($0 \leq k \leq K-1$) PSS are defined as p(k), t(k) and f(k) respectively. p(k) and t(k) are obtained by the PSS detection, and f(k) is obtained by a frequency offset estimation module. If there are two Rx antennae, i.e., Rx0 and Rx1, the antennae may have different gains due to the fading channel environment. A gain factor Δ of the two Rx antennae is expressed as: Δ=gain_Rx0/gain_Rx1, wherein gain_Rx0 and gain_Rx1 represent the power gains of Rx0 and Rx1 respectively.

Figure 6:
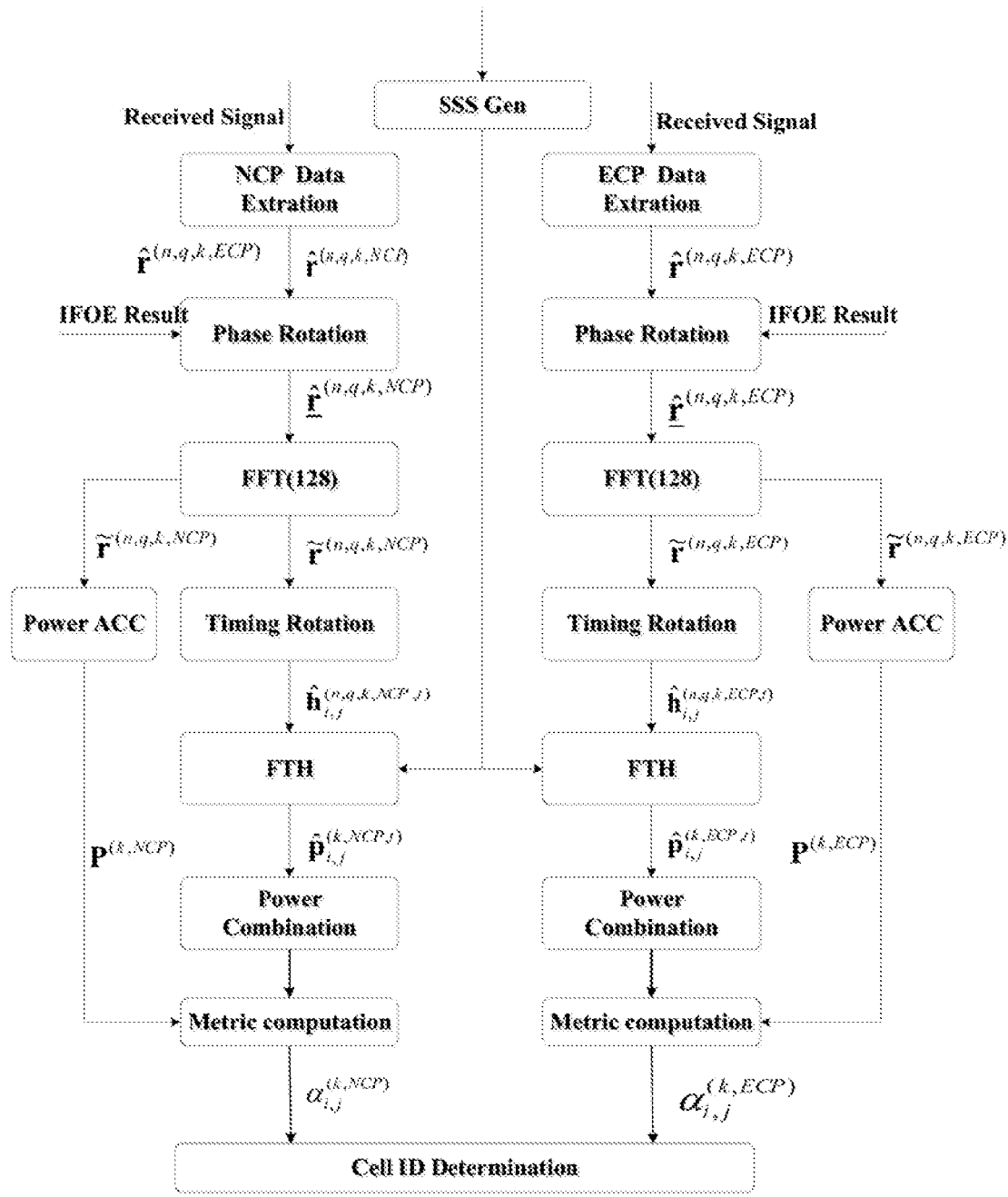
FIG. 6 is a schematic view showing the application of the method to detect a secondary synchronous signal.

Referring to FIG. 6, the SSS detection method according to embodiments herein comprises an SSS extraction step, a synchronous rotation step, a correlation calculation step, a power accumulation step, an SNR calculation step and a cell ID determination step.

In the SSS extraction step, the SSSs in a normal CP mode and an extended CP mode will be extracted at first The synchronization time of the SSS may be expressed as t(k)−δ, with a data range of [t(k)−δ, t(k)−δ+27]. δ represents a difference of the synchronization time between PSS and SSS, and its value depends on the CP mode and the frame structure, as shown in the following Table.

| Frame Structure | CP Mode | |
| --- | --- | --- |
| | Normal CP | Extended CP |
| TDD | 412 | 480 |
| FDD | 137 | 160 |

To facilitate the subsequent description, in the embodiments herein, the SSS corresponding to the $n^{th}$ data block, the $q^{th}$ Rx antenna, the $k^{th}$ PSS candidate and the xCP (x='N' or 'E') mode is defined as a vector $\hat{r}^{(n, q, k, xCP)}$, wherein $$n \in [0, N-1], q \in [0, 1], k \in [0, K-1], x \in ['N', 'E'].$$

After extracting the data sequence in the time domain, it is required to modify the extracted original signal according to the frequency offset estimation result (i.e., to perform phase rotation), so as to obtain a signal $\hat{r}^{(n, q, k, xCP)}(m)$, i.e., $$\hat{r}^{(n, q, k, xCP)}(m) = r^{(n, q, k, xCP)}(m)e^{-j2\pi f(k)m},$$

wherein m=0, 1, 2, . . . , 127.

Then, the time-domain signal $\hat{r}^{(n, q, k, xCP)}(m)e^{-j2\pi f(k)m}$ is transformed to a frequency-domain signal $\tilde{r}^{(n, q, k, xcp)}$ through FFT, i.e., $$\tilde{r}^{(n, q, k, xcp)} = FFT(\hat{r}^{(n, q, k, xCP)}).$$

After obtaining the frequency-domain sequence, it is able to extract the first SSS sequence according to the distribution of the real SSSs.

According to the existing specification, the SSSs are carried on 62 central sub-carriers, and at this time the extracted first SSS sequence $\tilde{r}^{(n,q,k,xcp)}(m)$ (m=0, 1, 2, . . . , 61) is expressed as:

$$\tilde{r}^{(n, q, k, xcp)}(m) = \tilde{r}^{(n, q, k, xcp)}(m'),$$

wherein $$m' = \begin{cases} m + 97, & 0 \leq m \leq 30 \\ m - 30, & 31 \leq m \leq 60 \end{cases}.$$

Meanwhile, in order to facilitate the subsequent calculation on the signal power and the noise power, this step further includes calculating the power $P_{sig}^{(k, xcp)}$ of the received SSSs and the noise power $P_{noise}^{(k, xcp)}$ on the 10 blank sub-carriers by the following equations:

$$P_{sig}^{(k,xcp)} = \sum_{n=0}^{N-1}\sum_{m=1}^{31}\left(|\tilde{r}^{(n,0,k,xcp)}(m)|^2 + \Delta|\tilde{r}^{(n,1,k,xcp)}(m)|^2\right) +$$

$$\sum_{n=0}^{N-1}\sum_{m=97}^{127}\left(|\tilde{r}^{(n,0,k,xcp)}(m)|^2 + \Delta|\tilde{r}^{(n,1,k,xcp)}(m)|^2\right)$$

$$P_{noise}^{(k,xcp)} = \sum_{n=0}^{N-1}\sum_{m=32}^{36}\left(|\tilde{r}^{(n,0,k,xcp)}(m)|^2 + \Delta|\tilde{r}^{(n,1,k,xcp)}(m)|^2\right) +$$

$$\sum_{n=0}^{N-1}\sum_{m=92}^{96}\left(|\tilde{r}^{(n,0,k,xcp)}(m)|^2 + \Delta|\tilde{r}^{(n,1,k,xcp)}(m)|^2\right)$$

$P_{sig}^{(k,xcp)}$ and $P_{noise}^{(k,xcp)}$ constitute the entire power of the received signal.

After obtaining the original SSS sequence $\tilde{r}^{(n, q, k, xcp)}$, it needs to perform synchronous rotation thereon, so as to obtain a plurality of second sequences corresponding to the plurality of channel paths. The number of the second sequences is set as $N_T$, and the SSS synchronization time determined according to the PSS detection result is set as T. Meanwhile, a sequence pathIndx of a channel path is defined as [T−N, T−N+1, . . . , T−1, T, T+1, . . . , T+M], wherein N and M may be any value according to the practical need. e.g., N=1 and M=2, or N=2 and M=3.

According to the determined pathIndx, the synchronous rotation is performed on $\tilde{r}^{(n, q, k, xcp)}(m)$ to obtain a series of continuous channel paths $\tilde{r}^{(n, q, k, xcp,t)}(m)$ by the following equation:

$$\tilde{r}^{(n, q, k, xcp,t)}(m) = \tilde{r}^{(n, q, k, xcp)}(m)e^{-j2\pi tm'/64}, t \in \text{pathIndx},$$

wherein $$m' = \begin{cases} m, & 0 \leq m \leq 30 \\ m + 1, & 31 \leq m \leq 60 \end{cases}.$$

The correlation calculation step will be performed after obtaining the plurality of SSS sequences. In this step, at first it is required to calculate, through FFT, a correlation value of each $\tilde{r}^{(n,\,q,\,k,\,xcp,\,t)}$ and the SSS standard sequence $s_{i,j}$ by the equation $\tilde{h}_{i,j}^{(n,\,q,\,k,\,xCP,t)} = \mathrm{FHT}(\tilde{r}^{(n,\,q,\,k,\,xcp,\,t)}, s_{i,j})/64$, wherein $i \in [0,167]$, $j \in [0, 1]$, and $s_{i,\,0}$ and $s_{i,\,1}$ correspond to the SSS standard sequences on a sub-frame 0 and a sub-frame 5 respectively, Actually, the channel estimation result of the different SSS standard sequences corresponding to the respective channel paths within the channel window in the time domain is obtained through this step.

The power accumulation step will be performed after obtaining the channel estimation result, i.e., for each channel path, the power of the channel estimation of the data sequences from the antennae and the data blocks are accumulated so as to obtain $\hat{p}_{i,j}^{(k,\,xCP,\,t)}$, i.e., $$\hat{p}_{i,j}^{(k,\,xCP,\,t)} = \sum_{n=0}^{N-1}(|\tilde{h}_{i,\,mod(n+j,2)}^{(n,\,0,\,k,\,xCP,\,t)}|^2 + \Delta|\tilde{h}_{i,\,mod(n+j,\,2)}^{(n,\,1,\,k,\,xCP,\,t)}|^2)$$

The SNR calculation step will be performed after obtaining $\hat{p}_{i,j}^{(k,\,xCP,\,t)}$. In this step, at first it is required to calculate the noise power $\sigma_{i,j}^2$ corresponding to each SSS standard sequence $s_{i,j}$ by the following equation:

$$\sigma_{i,j}^2 = (P_{sig}^{(k,\,xCP)} + P_{noise}^{(k,\,xCP)}) - \Sigma_{t \in pathIndx} \hat{p}_{i,j}^{(k,\,xCP,\,t)}/(72 - N_T).$$

Then, it is required to calculate a sum pathPow$_{i,j}$ of the useful power of all the valid paths with respect to each SSS standard sequence $S_{i,j}$ by the following equation:

$$\mathrm{path}Pow_{i,j} = \Sigma_{t \in pathIndx} \hat{p}_{i,j}^{(k,\,xCP,\,t)},$$
$$\mathrm{if}\ \hat{p}_{i,j}^{(k,\,xCP,\,t)} > \mathrm{Threshold}*\sigma^2.$$

The channel path will be a valid channel path if $\hat{p}_{i,j}^{(k,\,xCP,\,t)} > \mathrm{Threshold}*\sigma^2$. If there is no channel path that meets the requirement, the channel path with the maximum power will be selected as the valid channel path.

After obtaining pathPow$_{i,j}$ and the number of the valid paths pathNum, the SNR $\alpha_{i,j}^{(k,\,xCP)}$ of the SSS standard sequence $s_{i,j}$ will be calculated by the following equation:

$$\alpha_{i,j}^{(k,\,xCP)} = (\mathrm{path}Pow_{i,j} - \sigma^2 \times \mathrm{path}Num_{i,j})/\sigma^2.$$

The cell ID determination step will be performed after obtaining the SNR of each SSS standard sequence $s_{i,j}$, i.e., the cell ID may be determined according to the SSS standard sequence with the maximum SNR.

After determining the cell ID, the method of embodiments herein further comprises judging whether or not the maximum SNR is greater than or equal to a predetermined threshold, if yes, determining that the cell with the cell ID is a valid cell, and otherwise determining that the cell with the cell ID is an invalid cell. As a result, the false alarm rate during the SSS detection will be enhanced.

Figure 7:
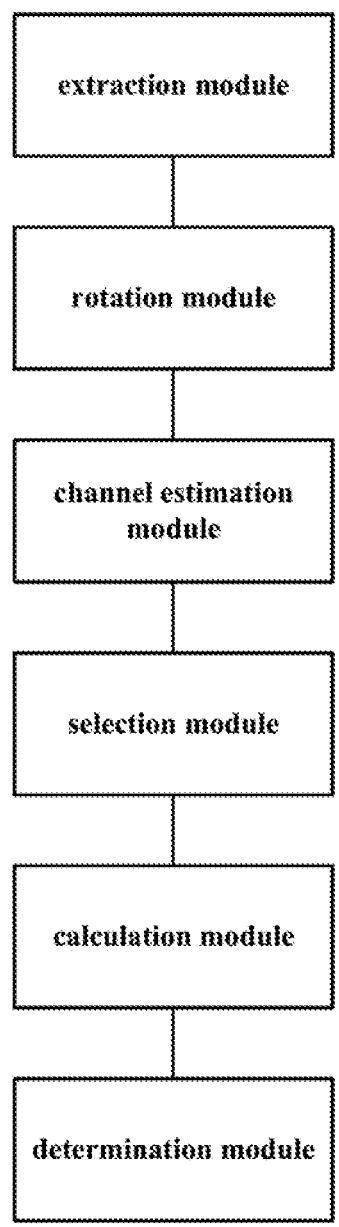
FIG. 7 is a schematic view showing a structure of a device for detecting a secondary synchronous signal.
Figure 8:
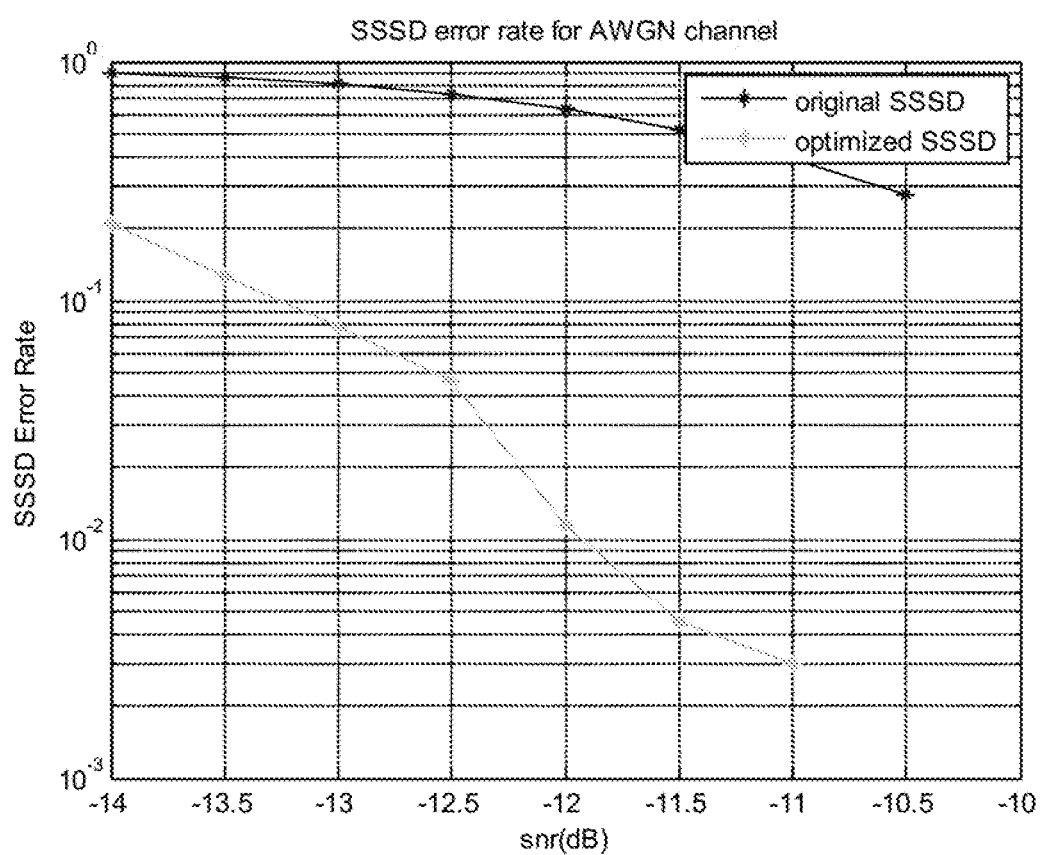
FIGS. 8-15 are schematic views showing the simulation results of the method according to embodiments herein.
Figure 9:
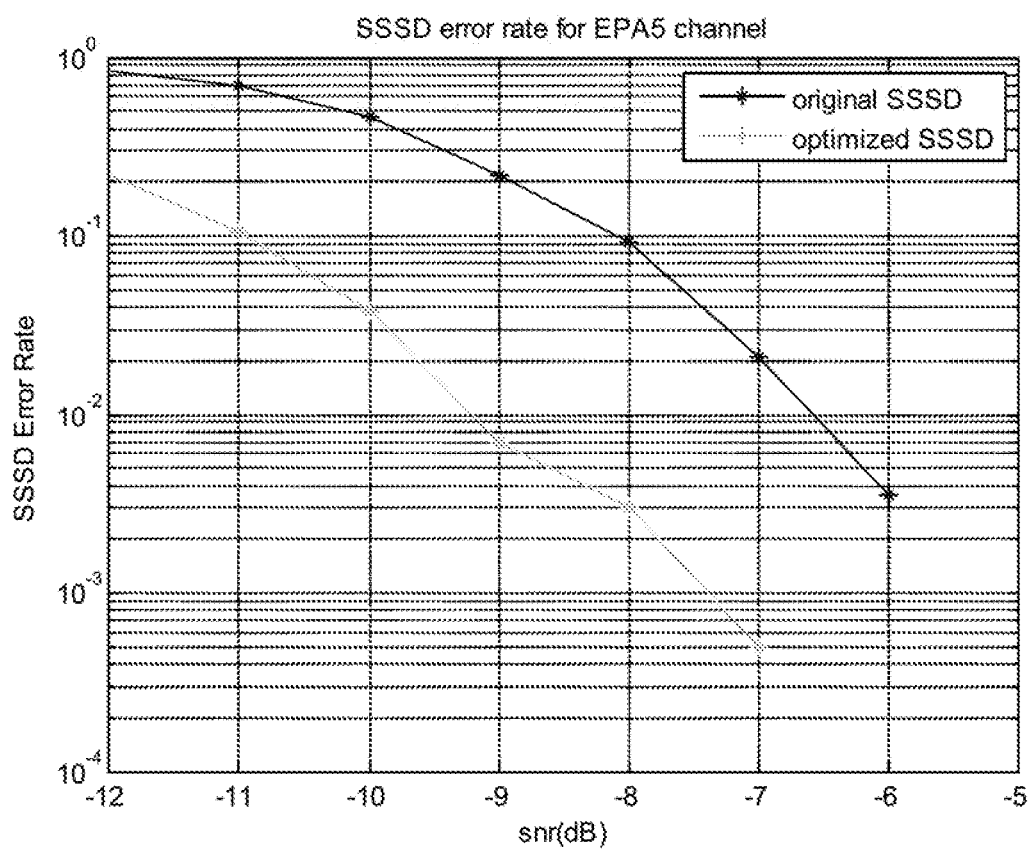
Figure 10:
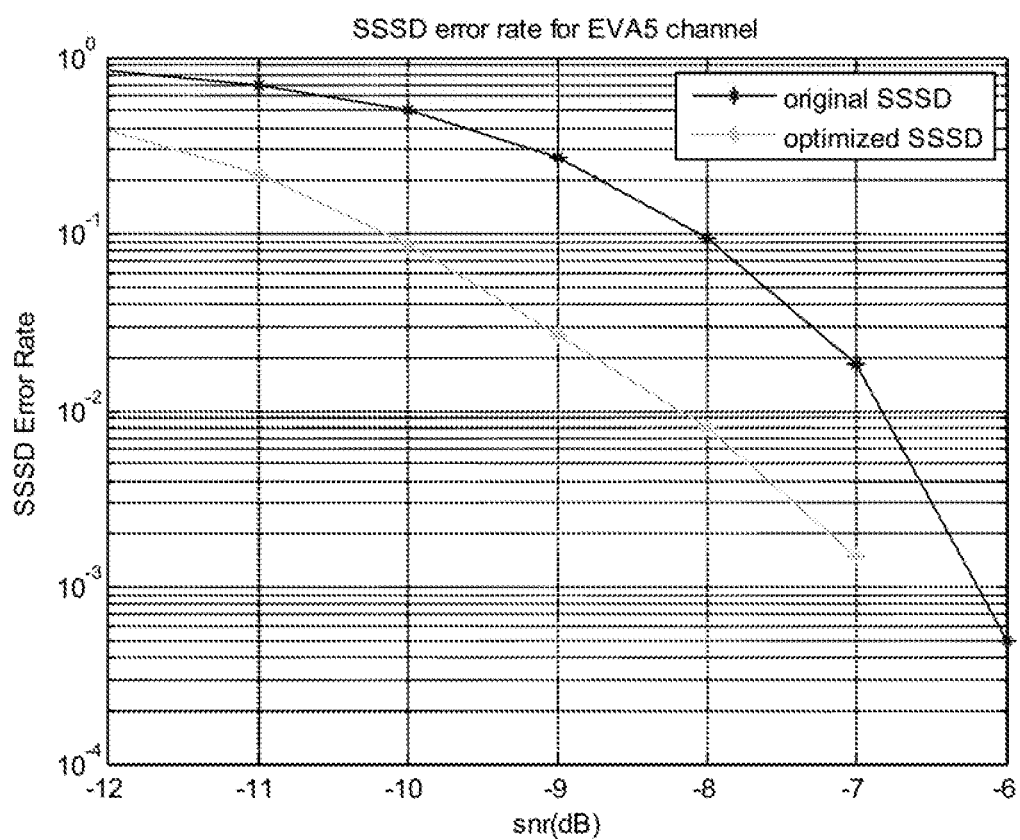
Figure 11:
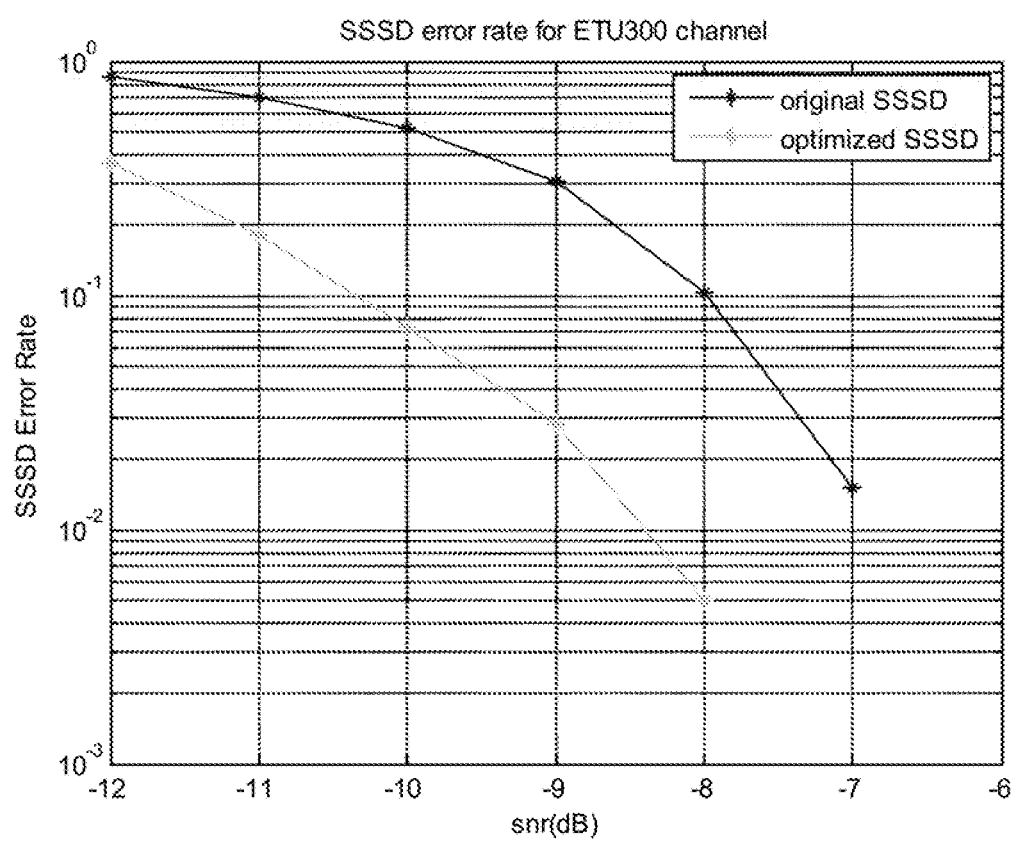
Figure 12:
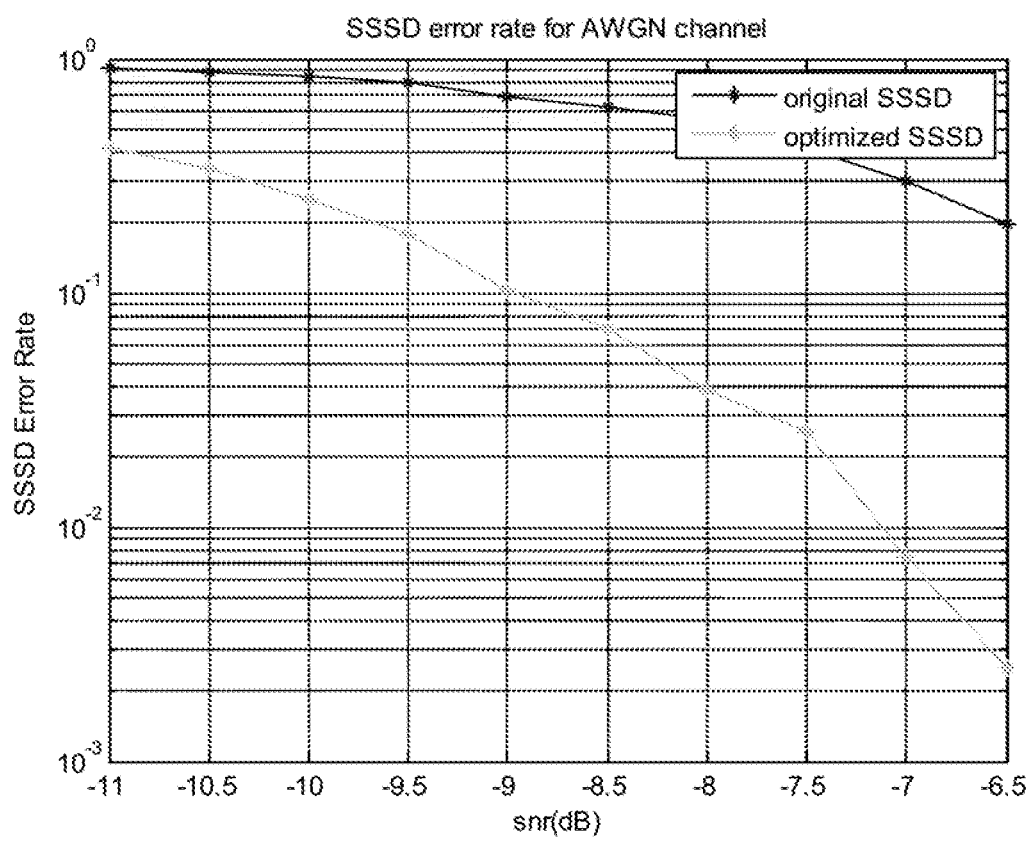
Figure 13:
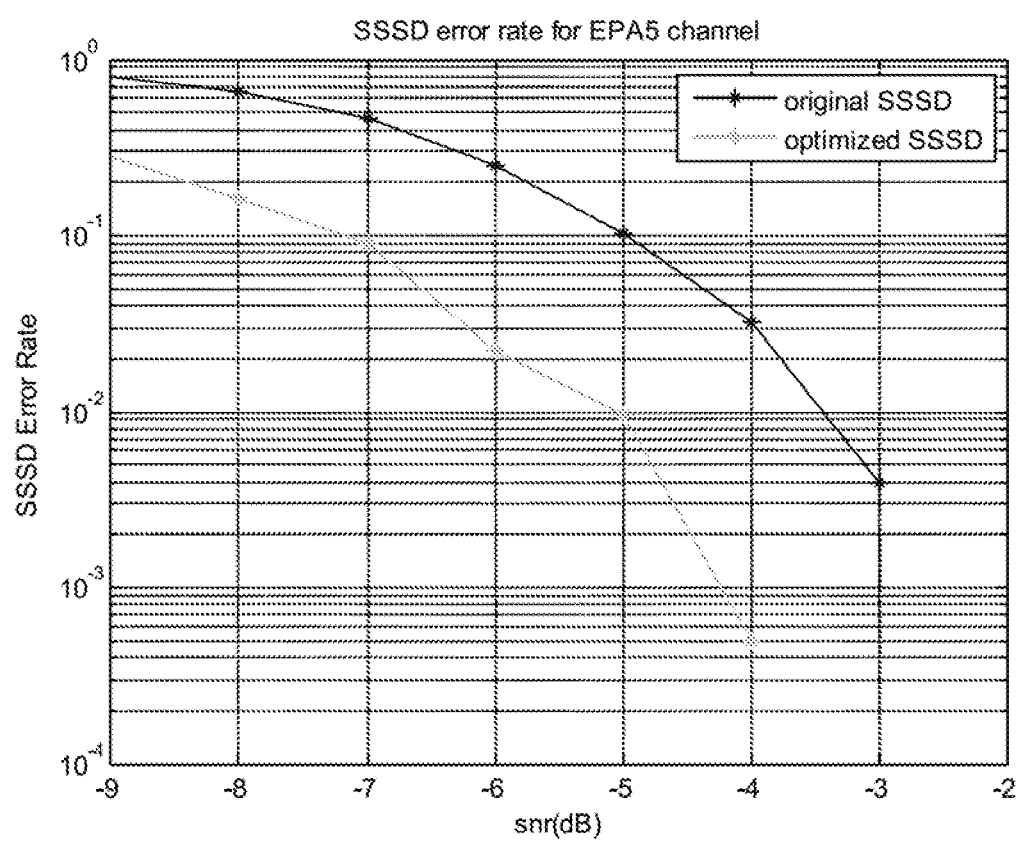
Figure 14:
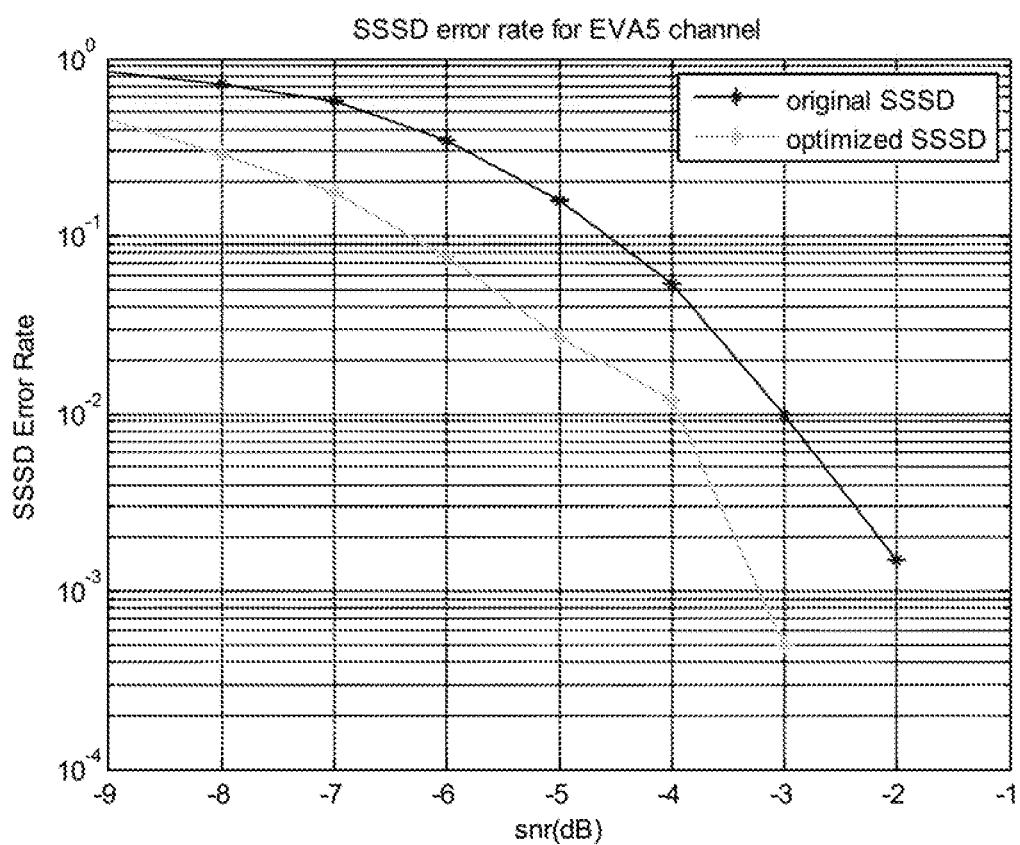
Figure 15:
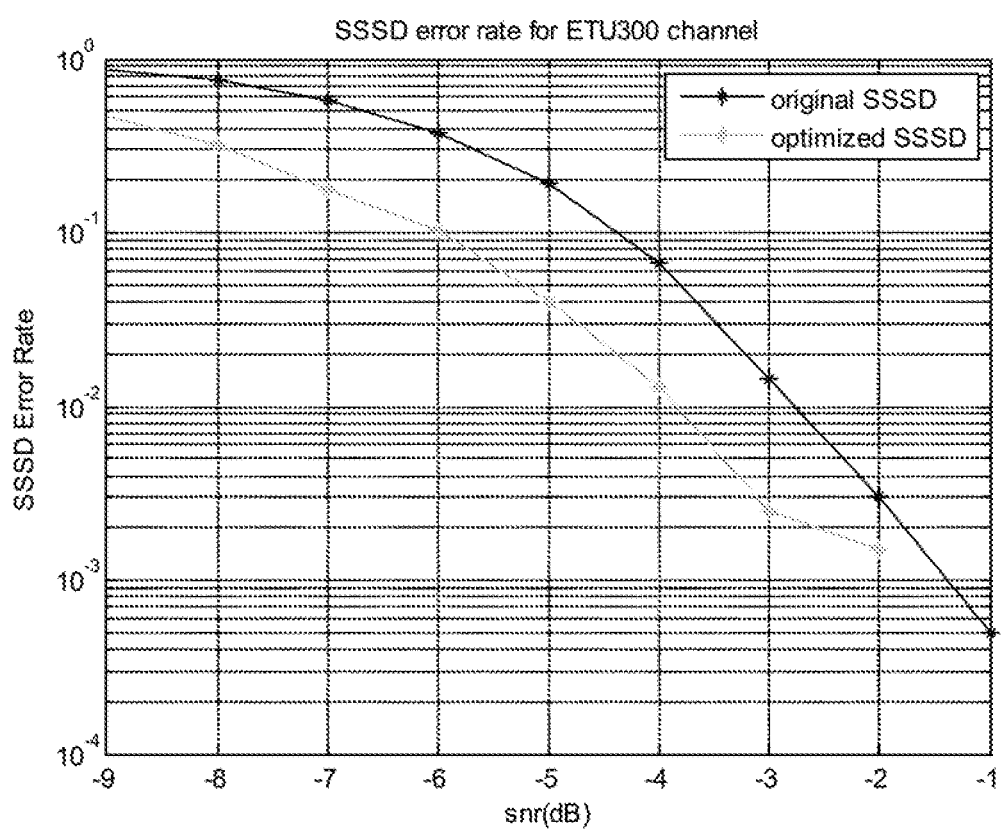

The embodiments herein further provide a device for detecting a secondary synchronous signal, as shown in FIG. 7, comprising:

an extraction module, configured to extract a first SSS sequence from a received signal according to a PSSS detection result;

a rotation module, configured to perform a rotation operation on the first SSS sequence, so as to obtain at least two second sequences including the first SSS sequence, channel paths corresponding to the at least two second sequences being located within a channel window;

a channel estimation module, configured to calculate a channel estimation result of each SSS standard sequence corresponding to each of the second sequences;

a selection module, configured to select, according to the channel estimation result, a valid channel path corresponding to the respective SSS standard sequence from the channel paths corresponding to the second sequences;

a calculation module, configured to calculate a signal-to-noise ratio corresponding to the respective SSS standard sequence according to the valid channel path corresponding to the respective SSS standard sequence; and a determination module, configured to determine a cell ID according to the SSS standard sequence corresponding to the maximum signal-to-noise ratio.

The device further comprises:

a judgment module, configured to judge whether or not the maximum signal-to-noise ratio is greater than or equal to a predetermined threshold, if yes, determine that the cell with the cell ID is a valid cell, and otherwise, determine that the cell with the cell ID is an invalid cell.

The extraction module comprises:

a first unit, configured to acquire a first signal including an original SSS sequence from the received signal according to the PSS detection result;

a modification unit, configured to modify the first signal according to a frequency offset estimation result, to obtain a second signal;

a transformation unit, configured to transform the second signal from a time domain to a frequency domain, to obtain a first data sequence; and an extraction unit, configured to extract the first SSS sequence from the first data sequence.

The channel estimation module calculates the channel estimation result through FHT.

The SNR corresponding to the SSS standard sequence $S_{i,j}$ is $(\mathrm{path}Pow_{i,j} - \sigma_{i,j}^2 * \mathrm{path}Num_{i,j})/\sigma_{i,j}^2$, wherein path-Pow$_{i,j}$ represents a sum of the power of the valid channel paths corresponding to the SSS standard sequence $S_{i,j}$ within the channel window, pathNum$_{i,j}$ represents the number of the valid channel paths corresponding to the SSS standard sequence $S_{i,j}$ within the channel window, and $\sigma_{i,j}^2$ represents the noise power corresponding to the SSS standard sequence $S_{i,j}$.

The power of the channel paths corresponding to the valid SSS sequences is greater than a first predetermined multiple of $\sigma_{i,j}^2$, and greater than a second predetermined multiple of the maximum power of the channel path.

The above embodiments of the present application may be implemented in software and/or hardware. Therefore, the method for detecting the secondary synchronous signal according to the embodiments of the present application may be implemented by utilizing processing devices such as universal processor, signal processor and so on. A computer program includes program codes stored in computer readable medium. The program codes may be loaded and executed by a processor to implement the above methods.

In order to verify the performance of the non-coherent SSS detection, embodiments herein provide eight simulation results, four of which are obtained in an ICS scenario and the other four of which are obtained in a CCS scenario.

It is to be noted that, in order to verify the performance of the non-coherent SSS detection independently, it is presumed that, in the simulation tests, the synchronous detection result and PSS ID detection result are both accurate, and the frequency offset is less than 2000 Hz.

The following table shows simulation conditions corresponding to the eight simulation results respectively, and FIGS. 7-14 show the simulation results.

| Parameter | Case ID | | | | | | | |
|---|---|---|---|---|---|---|---|---|
| | Test 1 | Test 2 | Test 3 | Test 4 | Test 5 | Test 6 | Test 7 | Test 8 |
| Cell search type | ICS | ICS | ICS | ICS | CCS | CCS | CCS | CCS |
| cell ID | 100 | 100 | 100 | 100 | 100 | 100 | 100 | 100 |
| Frequency Offset(Hz) | 1000 | 1000 | 1000 | −1000 | 1000 | 1000 | 1000 | −1000 |
| Channel type | AWGN | EPA5 | EVA5 | ETU300 | AWGN | EPA5 | EVA5 | ETU300 |

In FIGS. 8-15, a simulation curve corresponding to "Original SSSD" is a curve obtained according to the existing coherent SSS detection method, while a simulation curve corresponding to "optimized SSSD" is a curve obtained according to the non-coherent SSS detection of embodiments herein. In the fading channel environment, the performance of the existing coherent SSS detection method is better than the performance of the existing non-coherent SSS detection method, thus the non-coherent SSS detection method of embodiments herein is compared with the existing coherent SSS detection method, so as to show the effect of embodiments herein.

As can be found from the simulation results, the method of embodiments herein, as compared with the existing coherent SSS detection method, can reduce the error rate of the SSS detection remarkably, either in the ICS scenario or in the CCS scenario.

What is claimed is:

1. A method for detecting a secondary synchronous signal in a Long Term Evolution LTE system, comprising:
    Step S1: extracting a first secondary synchronous signal SSS sequence from a received signal according a primary synchronous signal PSS detection result;
    Step S2: performing rotation on the first SSS sequence, to obtain at least two second sequences including the first SSS sequence, wherein channel paths corresponding to the at least two second sequences being located within a channel window in a time domain;
    Step S3: calculating a channel estimation result of each of the second sequences corresponding to each of SSS standard sequences;
    Step S4: selecting, according to the channel estimation result, valid channel paths corresponding to the respective SSS standard sequence from the channel paths corresponding to the second sequences;
    Step S5: calculating a signal-to-noise ratio corresponding to the respective SSS standard sequence according to the valid channel paths corresponding to the respective SSS standard sequence; and
    Step S6: determining a cell ID according to the SSS standard sequence corresponding to a maximum signal-to-noise ratio.

2. The method according to claim 1, further comprising:
    Step S7: judging whether or not the maximum SNR is greater than or equal to a predetermined threshold, if yes, determining that the cell with the cell ID is a valid cell, and otherwise determining that the cell with the cell ID is an invalid cell.

3. The method according to claim 1, wherein Step S1 comprises:
    Step S11: acquiring a first signal including an original SSS sequence from the received signal according to the PSS detection result;
    Step S12: modifying the first signal according to a frequency offset estimation result, to obtain a second signal;
    Step S13: transforming the second signal from a time domain to a frequency domain, to obtain a first data sequence; and
    Step S14: extracting the first SSS sequence from the first data sequence.

4. The method according to claim 1, wherein in Step S3, the channel estimation result is calculated through Fast Hadamard Transform FHT.

5. The method according to claim 1, wherein an SNR corresponding to an SSS standard sequence $S_{i,j}$ is $(\text{pathPow}_{i,j} - \sigma_{i,j}^2 * \text{pathNum}_{i,j})/\sigma_{i,j}^2$ wherein $\text{pathPow}_{i,j}$ represents a sum of the power of valid channel paths corresponding to the SSS standard sequence $S_{i,j}$ within the channel window, $\text{pathNum}_{i,j}$ represents the number of the valid channel paths corresponding to the SSS standard sequence $S_{i,j}$ within the channel window, and $\sigma_{i,j}^2$ represents the noise power corresponding to the SSS standard sequence $S_{i,j}$ in the received signal.

6. The method according to claim 1, wherein the useful power of the channel paths corresponding to valid SSS sequences is greater than a first predetermined multiple of $\sigma_{i,j}^2$, and $\sigma_{i,j}^2$ represents the noise power corresponding to the SSS standard sequence $S_{i,j}$ in the received signal.

7. The method according to claim 1, wherein the power of the channel paths corresponding to valid SSS sequences is greater than a second predetermined multiple of a maximum power of the channel paths.

8. A device for detecting a secondary synchronous signal in a LTE system, comprising:
    an extraction module, configured to extract a first SSS sequence from a received signal according to a PSSS detection result;
    a rotation module, configured to perform rotation on the first SSS sequence, to obtain at least two second sequences including the first SSS sequence, wherein channel paths corresponding to the at least two second sequences being located within a channel window in a time domain;
    a channel estimation module, configured to calculate a channel estimation result of each of the second sequences corresponding to each of SSS standard sequences;
    a selection module, configured to select, according to the channel estimation result, valid channel paths corresponding to the respective SSS standard sequence from the channel paths corresponding to the second sequences;
    a calculation module, configured to calculate a signal-to-noise ratio corresponding to the respective SSS standard sequence according to the valid channel paths corresponding to the respective SSS standard sequence; and

- a determination module, configured to determine a cell ID according to the SSS standard sequence corresponding to a maximum signal-to-noise ratio.

9. The device according to claim 8, further comprising:
- a judgment module, configured to judge whether or not the maximum signal-to-noise ratio is greater than or equal to a predetermined threshold, if yes, determine that the cell with the cell ID is a valid cell, and otherwise, determine that the cell with the cell ID is an invalid cell.

10. The device according to claim 8, wherein the extraction module comprises:
- a first unit, configured to acquire a first signal including an original SSS sequence from the received signal according to the PSS detection result;
- a modification unit, configured to modify the first signal according to a frequency offset estimation result, to obtain a second signal;
- a transformation unit, configured to transform the second signal from a time domain to a frequency domain, to obtain a first data sequence; and
- an extraction unit, configured to extract the first SSS sequence from the first data sequence.

11. The device according to claim 8, wherein the channel estimation module calculates the channel estimation result through FHT.

12. The device according to claim 8, wherein an SNR corresponding to an SSS standard sequence $S_{i,j}$ is $(\text{pathPow}_{i,j} - \sigma_{i,j}^2 * \text{pathNum}_{i,j})/\sigma_{i,j}^2$ wherein $\text{pathPow}_{i,j}$ represents a sum of the power of valid channel paths corresponding to the SSS standard sequence $S_{i,j}$, within the channel window, $\text{pathNum}_{i,j}$ represents the number of the valid channel paths corresponding to the SSS standard sequence $S_{i,j}$ within the channel window, and $\sigma_{i,j}^2$ represents the noise power corresponding to the SSS standard sequence $S_{i,j}$ in the received signal.

13. The device according to claim 8, wherein the useful power of the channel paths corresponding to valid SSS sequences is greater than a first predetermined multiple of $\sigma_{i,j}^2$, and $\sigma_{i,j}^2$ represents the noise power corresponding to the SSS standard sequence $S_{i,j}$ in the received signal.

14. The device according to claim 8, wherein the power of the channel paths corresponding to valid SSS sequences is greater than a second predetermined multiple of a maximum power of the channel paths.

* * * * *